United States Patent
Fukuoka et al.

(10) Patent No.: US 11,294,244 B2
(45) Date of Patent: Apr. 5, 2022

(54) ELECTRO-OPTIC DEVICE

(71) Applicant: Japan Display Inc., Tokyo (JP)

(72) Inventors: Nobuko Fukuoka, Tokyo (JP); Takenori Hirota, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/118,743

(22) Filed: Dec. 11, 2020

(65) Prior Publication Data

US 2021/0096407 A1    Apr. 1, 2021

Related U.S. Application Data

(63) Continuation of application No. PCT/JP2019/018153, filed on Apr. 26, 2019.

(30) Foreign Application Priority Data

Jun. 21, 2018 (JP) ............... JP2018-118037

(51) Int. Cl.
| | |
|---|---|
| *G02F 1/1339* | (2006.01) |
| *G02F 1/133* | (2006.01) |
| *G02F 1/1334* | (2006.01) |
| *G02F 1/1337* | (2006.01) |
| *G02F 1/1341* | (2006.01) |
| *G02F 1/1343* | (2006.01) |

(52) U.S. Cl.
CPC .......... *G02F 1/1339* (2013.01); *G02F 1/1334* (2013.01); *G02F 1/1337* (2013.01); *G02F 1/1341* (2013.01); *G02F 1/13306* (2013.01); *G02F 1/134309* (2013.01); *G02F 2201/121* (2013.01); *G02F 2201/123* (2013.01)

(58) Field of Classification Search
CPC .... G02F 1/1334; G02F 1/1337; G02F 1/1339; G02F 1/1341; G02F 1/133615
See application file for complete search history.

(56) References Cited

U.S. PATENT DOCUMENTS

| | | | |
|---|---|---|---|
| 6,768,532 B1 | 7/2004 | Sekiguchi | |
| 2008/0007674 A1* | 1/2008 | Akiyama | G02F 1/1339 349/65 |
| 2017/0123247 A1 | 5/2017 | Hirota | |
| 2017/0269433 A1 | 9/2017 | Sugiyama et al. | |

FOREIGN PATENT DOCUMENTS

CN            1702505 A   * 11/2005   ....... G02F 1/133784

OTHER PUBLICATIONS

International Search Report dated Jul. 16, 2019 for the PCT Application No. PCT/JP2019/018153, with English translation.

* cited by examiner

*Primary Examiner* — Jessica M Merlin
(74) *Attorney, Agent, or Firm* — Michael Best & Friedrich LLP

(57) ABSTRACT

According to one embodiment, an electro-optic device includes an electro-optic panel including a transparent base, a sealing portion provided in a peripheral area of the transparent base, a liquid crystal composition sealed by the transparent base and the sealing portion, an injection port for the liquid crystal composition provided in the peripheral area of the transparent base, and a light source arranged opposed to a side surface of the transparent base. The transparent base has a first side and a second side on an opposite side to the first side, the light source is opposed to the first side, and the injection port is opposed to the second side.

4 Claims, 10 Drawing Sheets

ELECTRO-OPTIC DEVICE

CROSS-REFERENCE TO RELATED APPLICATIONS

This application is a Continuation Application of PCT Application No. PCT/JP2019/018153, filed Apr. 26, 2019 and based upon and claiming the benefit of priority from Japanese Patent Application No. 2018-118037, filed Jun. 21, 2018, the entire contents of all of which are incorporated herein by reference.

FIELD

Embodiments described herein relate generally to an electro-optic device.

BACKGROUND

As an example of the electro-optic device, a display device using a liquid crystal composition is known. This display device includes a first substrate in which a plurality of pixels are arrayed in a matrix, a second substrate arranged opposed to the first substrate, and a liquid crystal composition. Here, the first substrate and the second substrate are bonded together by a sealing member except for an injection port for the liquid crystal composition. The liquid crystal composition is injected into the inside of the sealant from the injection port. Accordingly, the display device in which the liquid crystal composition is sealed is realized.

Meanwhile, during the conventional sealing-in of the liquid crystal composition, the liquid crystal composition is brought into contact with the injection port in a vacuum atmosphere, and then the liquid crystal composition is sealed in the inside of the sealant by a pressure difference and capillary action when the atmosphere returns to atmospheric pressure. At this time, however, a part of the liquid crystal composition may run around to the outside of the sealant. In this case, depending on the degree of running, for example, the liquid crystal composition may enter between a light source and a substrate or the liquid crystal composition may overlap a wiring line on the periphery of a substrate.

In that case, the product accuracy of the electro-optic device (display device using the liquid crystal composition) itself cannot be maintained constant. In addition, light-guiding properties from the light source to the substrate is degraded by the liquid crystal composition entering between the light source and the substrate (that is, an incidence portion). Furthermore, due to the liquid crystal composition covering a drive circuit or the wiring line on the periphery of the substrate, unintended light emission or color forming occurs on the periphery of the substrate, and display quality is degraded.

DETAILED DESCRIPTION

Figure 1:
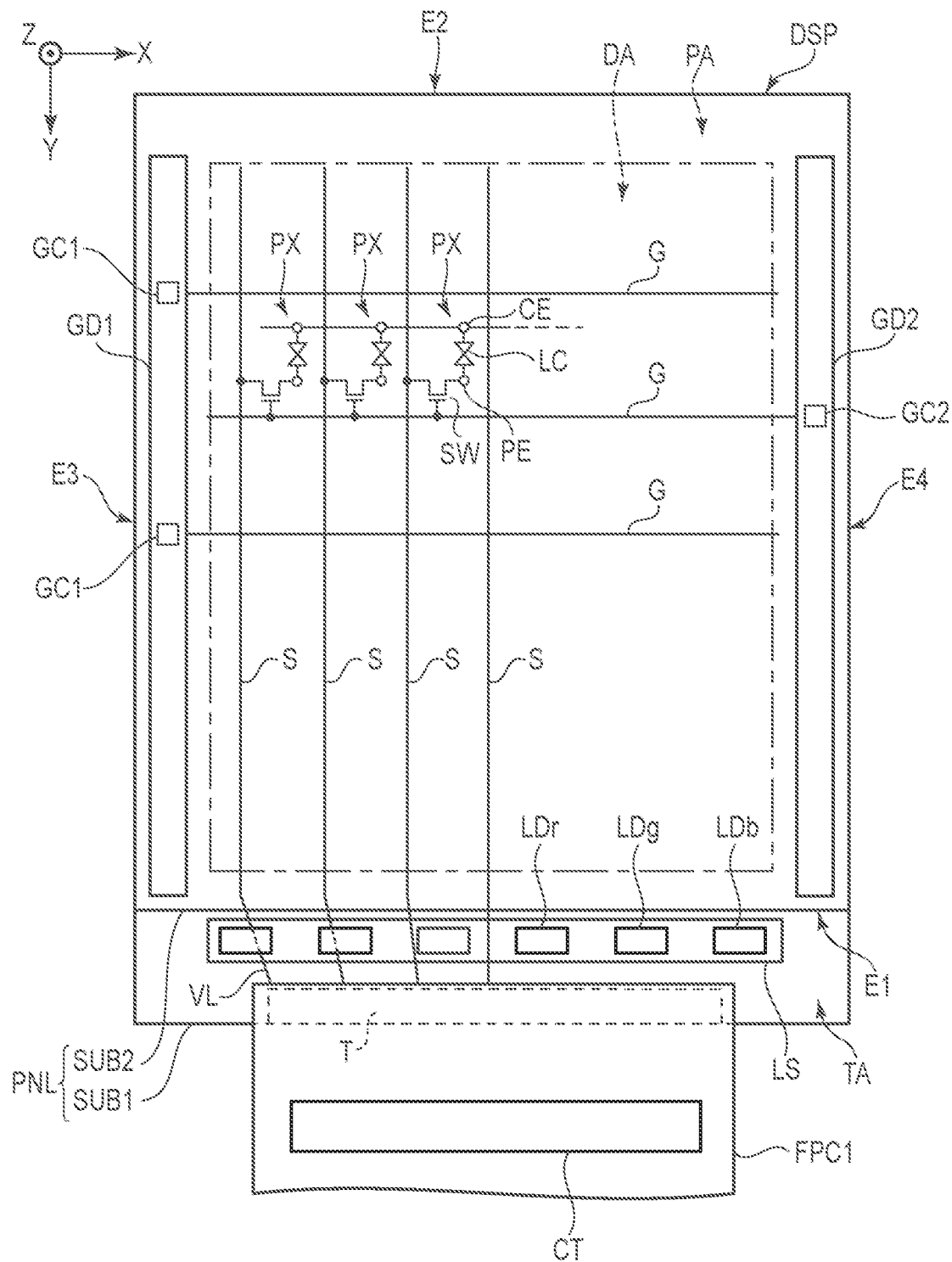
FIG. 1 is a plan view showing a configuration of an electro-optic device according to the first embodiment.

In general, according to one embodiment, an object is to provide an electro-optic device which can improve display quality while maintaining product accuracy.

An electro-optic device according to one embodiment includes an electro-optic panel including a transparent base, a sealing portion provided in a peripheral area of the transparent base, a liquid crystal composition sealed by the transparent base and the sealing portion, an injection port for the liquid crystal composition provided in the peripheral area of the transparent base, a light source arranged opposed to a side surface of the transparent base. The transparent base has a first side and a second side on an opposite side to the first side, the light source is opposed to the first side, and the injection port is opposed to the second side.

An electro-optic device according to one embodiment includes an electro-optic panel including a transparent base, a sealing portion provided in a peripheral area of the transparent base, a liquid crystal composition sealed by the transparent base and the sealing portion, a light source arranged opposed to a side surface of the transparent base, a drive circuit provided in the peripheral area of the transparent base. The sealing portion covers at least a part of the drive circuit.

An electro-optic device according to one embodiment includes an electro-optic panel including a transparent base, a sealing portion provided in a peripheral area of the transparent base, a liquid crystal composition sealed by the transparent base and the sealing portion, a light source arranged opposed to a side surface of the transparent base, a drive circuit provided in the peripheral area of the transparent base, and a conductive film arranged between the drive circuit and the liquid crystal composition. The conductive film is arranged at least between the drive circuit and the liquid crystal composition, and a predetermined voltage is supplied to the conductive film.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the respective parts are illustrated schematically in the drawings, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, constituent elements which function in the same or a similar manner to those described in connection with preceding drawings are denoted by the same reference numbers, and detailed description of them are omitted in some cases.

In the present embodiment, expressions such as "α includes A, B or C", "α includes any one of A, B and C", "α includes one selected from a group consisting of A, B and C" do not exclude a case where "α includes combinations of A, B and C" unless otherwise specified. Furthermore, these expressions do not exclude a case where α includes other elements.

In the expression "the first α, the second α and the third α" of the present specification, "the first", "the second", and "the third" are merely convenient numbers used for explaining the elements. That is, the expression "A includes the third α" includes a case where A does not include the first α and the second α other than the third α unless otherwise specified.

In the embodiments, a liquid crystal display device is disclosed as an example of the electro-optic device. However, the embodiments do not prevent application of individual technical ideas disclosed in the embodiments to various other electro-optic devices. The other electro-optic devices are, for example, a self-luminous display device including an organic electroluminescent display element, an electronic paper display device including an electrophoretic element or the like, a display device employing a microelectromechanical systems (MEMS), a display device employing electrochromism, and the like. In addition, the electro-optic device may be a device other than a display device such as a screen device which can switch a state where a background can be seen through a panel and a state where the background cannot be seen through the panel by electric control.

First Embodiment

FIG. 1 is a plan view showing a configuration of a display device DSP using a liquid crystal composition as an example of an electro-optic device according to the present embodiment. In the drawings, a first direction X, a second direction Y and a third direction Z indicate directions crossing each other. In this case, the first direction X, the second direction Y and the third direction Z may be orthogonal to each other or may cross each other at an angle other than 90 degrees.

The display device DSP includes a display panel (electro-optic panel) PNL, a light source LS, a flexible printed circuit board FPC1 and a controller CT. The display panel PNL includes a first substrate SUB1, a second substrate SUB2, and a liquid crystal layer LC sealed in a gap between these substrates.

In FIG. 1, as one example, the second substrate SUB2 (a second transparent base 20 which will be described later) has a rectangular shape having a first side E1, a second side E2 on an opposite side to the first side E1, and a third side E3 and a fourth side E4 extending between the first side E and the second side E2 in planar view. The fourth side E4 is arranged on an opposite side to the third side E3. The first side E1 and the second side E2 are parallel to the first direction X, and the third side E3 and the fourth side E4 are parallel to the second direction Y.

The first substrate SUB1 also has a rectangular shape, and three sides overlap the respective sides E2 to E4 of the second substrate SUB2. A lower side in the drawing of the first substrate SUB1 projects from the first side E1. The lower part of the first substrate SUB1 projecting from the first side E1 constitutes a terminal area TA. A terminal T for external connection is provided in the terminal area TA, and the flexible printed circuit board FPC1 is connected to the terminal T. Note that the shapes of the first substrate SUB1 and the second substrate SUB2 are not limited to a rectangular shape.

The display panel PNL includes a display area (electro-optic area) DA which displays an image and a peripheral area PA on the periphery of the display area DA in planar view. The terminal area TA is included in the peripheral area PA. On the other hand, the display area DA is arranged between the first side E1 and the second side E2. In the display area DA, a plurality of scanning signal lines G and a plurality of video signal lines S are arranged in a matrix in the first substrate SUB1. The scanning signal lines G extend in the first direction X and are arranged at intervals in the second direction Y. The video signal lines S extend in the second direction Y and are arranged at intervals in the first direction X.

A plurality of pixels PX arrayed in a matrix are included in the display area DA. The first substrate SUB1 includes a pixel electrode PE arranged in each pixel PX and a switching element SW. The switching element SW is composed of, for example, a thin-film transistor made of polysilicon. On the other hand, the second substrate SUB2 includes a common electrode CE extending over the pixels PX. To the common electrode CE, a common voltage (for example, an AC voltage) is supplied from an external power supply (not shown) via the controller CT. The common electrode CE and the pixel electrode PE are arranged opposed to each other. Note that the common electrode CE and the controller CT are electrically connected via a conductive member (not shown) which connects the first substrate SUB1 and the second substrate SUB2.

In the peripheral area PA, a plurality of drive circuits (for example, a first scanning line driver GD1 and a second scanning line driver GD2) are provided. In FIG. 1, as one example, the first scanning line driver GD1 is arranged in the peripheral area PA between the display area DA and the third side E3, and the second scanning line driver GD2 is arranged in the peripheral area PA between the display area DA and the fourth side E4.

The scanning signal lines G extend to the peripheral area PA and are each connected to the first scanning line driver GD1 or the second scanning line driver GD2. The video signal lines S are connected to the terminal T via wiring lines VL provided in the peripheral area PA. Note that first scanning circuits GC1 connected to the scanning signal lines G are provided in the first scanning line driver GD1, and second scanning circuits GC2 connected to the scanning signal lines G are provided in the second scanning line driver GD2. Although not specifically illustrated, a shift register circuit, a level shifter circuit, a buffer circuit and the like are included in each of the scanning circuits GC1 and GC2. The shift register circuit included in each of the scanning circuits GC1 and GC2 sequentially transmits a signal for driving the scanning signal line G. The level shifter circuit adjusts the level of a scanning signal supplied to the scanning signal line G. The buffer circuit supplies the scanning signal adjusted by the level shifter circuit to the scanning signal line G.

The light source LS is arranged in the peripheral area PA (more specifically, the terminal area TA). The light source LS is opposed to the first side E1 and includes a plurality of light-emitting elements LD. In the light-emitting elements LD, a light-emitting element LDr which emits red light, a light-emitting element LDg which emits green light, and a light-emitting element LDb which emits blue light are included. The light-emitting elements LDr, LDg and LDb may be arranged in the first direction X as shown in the drawing or may be stacked in the third direction Z. Note that a light-emitting element LD which emits light other than red light, green light and blue light may be provided in the light source LS.

The controller CT controls the first scanning line driver GD1, the second scanning line driver GD2 and the light source LS, and supplies a video signal to the video signal lines S. In FIG. 1, as one example, the controller CT is mounted on the flexible printed circuit board FPC1. However, the controller CT may be mounted on a member other than this.

Figure 2:
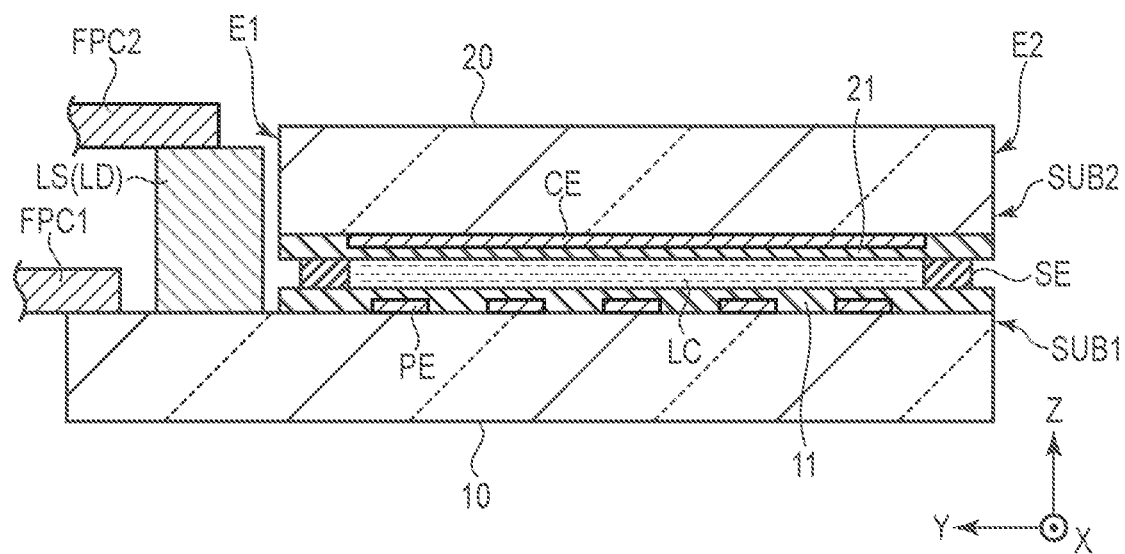
FIG. 2 is a cross-sectional view of the electro-optic device of FIG. 1.

FIG. 2 is a schematic cross-sectional view of the display device DSP shown in FIG. 1. Here, only main parts in a cross section of the display device DSP along a YZ plane defined by the second direction Y and the third direction Z will be explained.

The first substrate SUB1 includes a first transparent base 10, the pixel electrodes PE, and a first alignment film 11 covering the pixel electrodes PE. The second substrate SUB2 includes a second transparent base 20, a common electrode CE, and a second alignment film 21 covering the common electrode CE. The first substrate SUB1 and the second substrate SUB2 are bonded together by a transparent sealing portion SE. The liquid crystal layer LC is sealed in a space surrounded by the sealing portion SE, the first alignment film 11 and the second alignment film 21. That is, in the liquid crystal layer LC, a liquid crystal composition containing a polymeric material is sealed by the transparent bases 10 and 20 and the sealing portion SE (more specifically, a first portion SE1 which will be described later).

The pixel electrodes PE and the common electrode CE can be formed of, for example, a transparent conductive material made of indium tin oxide (ITO) or the like. The first alignment film 11 and the second alignment film 21 can be formed of, for example, polyimide, and have an alignment restriction force which aligns liquid crystal molecules contained in the liquid crystal layer LC (that is, the liquid crystal composition containing the polymeric material) in an initial alignment direction. This alignment restriction force can be imparted by, for example, rubbing treatment but may be imparted by another method such as photo-alignment treatment.

The light source LS (the light-emitting element LD) is arranged opposed to a side surface of the second substrate SUB2, and is arranged with a space along the first side E1 of the second substrate SUB2 (more specifically, the second transparent base 20). In FIG. 2, as one example, the light source LS is connected to a flexible printed circuit board FPC2, and the flexible printed circuit board FPC2 is connected to the controller CT.

Figure 3A:
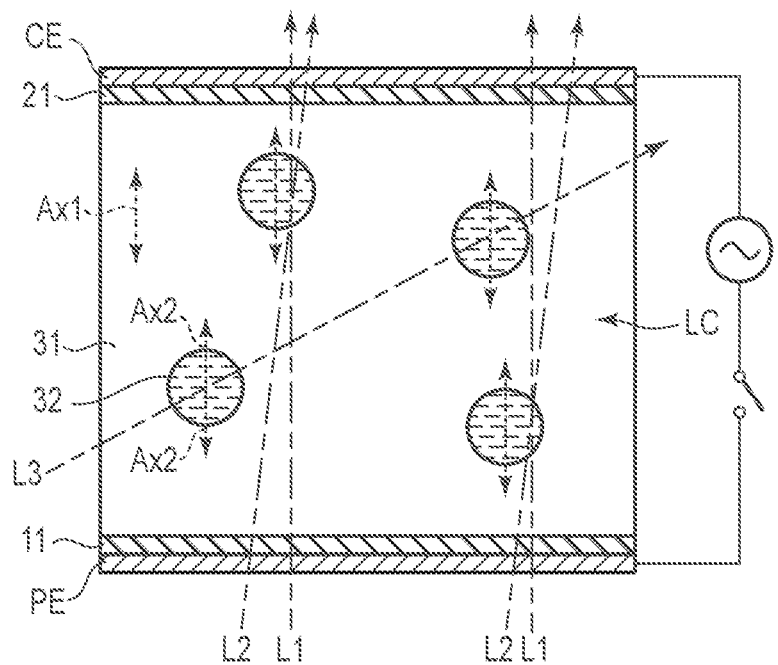
FIG. 3A is a cross-sectional view schematically showing a liquid crystal layer in a transparent state.
Figure 3B:
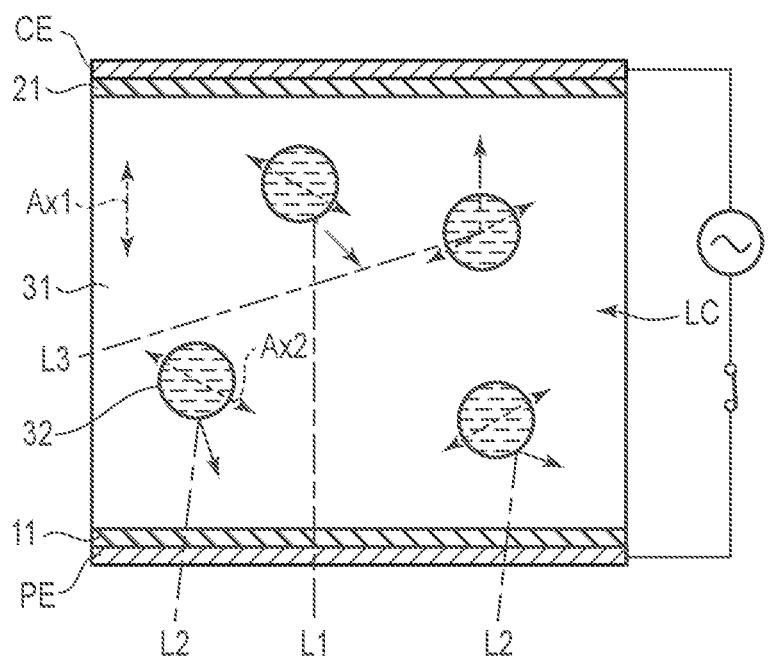
FIG. 3B is a cross-sectional view schematically showing the liquid crystal layer in a scattering state.

FIGS. 3A and 3B are cross-sectional views schematically showing the liquid crystal layer LC. The liquid crystal layer LC contains a liquid crystal polymer 31 and liquid crystal molecules 32 as an example of the liquid crystal composition containing the polymeric material. The liquid crystal polymer 31 is, for example, liquid crystal monomer polymerized in a state of being aligned in the initial alignment direction (referred to also as rubbing direction) by the alignment restriction force of the first alignment film 11 and the second alignment film 21. The liquid crystal molecules 32 are dispersed in gaps of the liquid crystal monomer, and when the liquid crystal monomer is polymerized, the liquid crystal molecules 32 are aligned in a predetermined direction depending on the alignment direction of the liquid crystal monomer.

Here, the liquid crystal molecule 32 may be a positive type having positive dielectric anisotropy or a negative type having negative dielectric anisotropy. In this case, the liquid crystal polymer 31 and the liquid crystal molecule 32 have equivalent optical anisotropy. The liquid crystal polymer 31 and the liquid crystal molecule 32 have substantially equivalent refractive anisotropy. That is, the liquid crystal polymer 31 and the liquid crystal molecule 32 have substantially equivalent ordinary refractive indexes and substantially equivalent extraordinary refractive indexes.

Note that, regarding the ordinary refractive indexes and the extraordinary refractive indexes, in either case, the value of the liquid crystal polymer 31 and the value of the liquid crystal molecule 32 do not have to perfectly match each other, and a difference due to a manufacturing error is allowed. In addition, the liquid crystal polymer 31 and the liquid crystal molecule 32 have difference responsiveness to an electric field. That is, the responsiveness to the electric field of the liquid crystal polymer 31 is lower than the responsiveness to the electric field of the liquid crystal molecule 32.

FIG. 3A shows, for example, a transparent state where voltage is not applied to the liquid crystal layer LC, that is, a state where a potential difference between the pixel electrode PE and the common electrode CE is zero. In this state, an optical axis Ax1 of the liquid crystal polymer 31 and an optical axis Ax1 of the liquid crystal molecule 32 are parallel to each other. The optical axis here corresponds to a line parallel to a traveling direction of a light beam that a refractive index has one value regardless of a polarization direction.

The liquid crystal polymer 31 and the liquid crystal molecule 32 have substantially equivalent refractive anisotropy as described above, and the optical axes Ax1 and Ax2 are parallel to each other. Therefore, there is hardly any difference in refractive index between the liquid crystal polymer 31 and the liquid crystal molecule 32 in all directions including the first direction X, the second direction Y and the third direction Z. Accordingly, a light beam L1 parallel to the third direction Z and light beams L2 and L3 inclined with respect to the third direction Z are transmitted through the liquid crystal layer LC almost without being scattered.

FIG. 3B shows, for example, a scattering state where voltage is applied to the liquid crystal layer LC, that is, a state where a potential difference is made between the pixel electrode PE and the common electrode CE. As described above, the responsiveness to the electric field of the liquid crystal polymer 31 is lower than the responsiveness to the electric field of the liquid crystal molecule 32. Therefore, in the scattering state where voltage is applied to the liquid crystal layer LC, while the alignment direction of the liquid crystal polymer 31 hardly changes, the alignment direction of the liquid crystal molecule 32 changes in accordance with the electric field. That is, the optical axis Ax2 is inclined with respect to the optical axis Ax1. Accordingly, a large difference in refractive index is made between the liquid crystal polymer 31 and the liquid crystal molecule 32 in all directions including the first direction X, the second direction Y and the third direction Z. At this time, the light beams L1 to L3 incident on the liquid crystal layer LC are scattered inside the liquid crystal layer LC.

Note that the configuration of the liquid crystal layer LC is not limited to the above-described configuration. For example, the liquid crystal layer LC containing a polymer having a linear shape in section and having an alignment restriction force and liquid crystal molecules aligned by this polymer may be composed, and may be set to the scattering state by the application of voltage to the liquid crystal layer LC. That is, as the liquid crystal layer LC of the present application, any configuration can be used as long as the configuration uses a liquid crystal composition containing a polymer material which can switch a transmitting state and a scattering state by an electric field formed between the pixel electrode PE and the common electrode CE.

Figure 4:
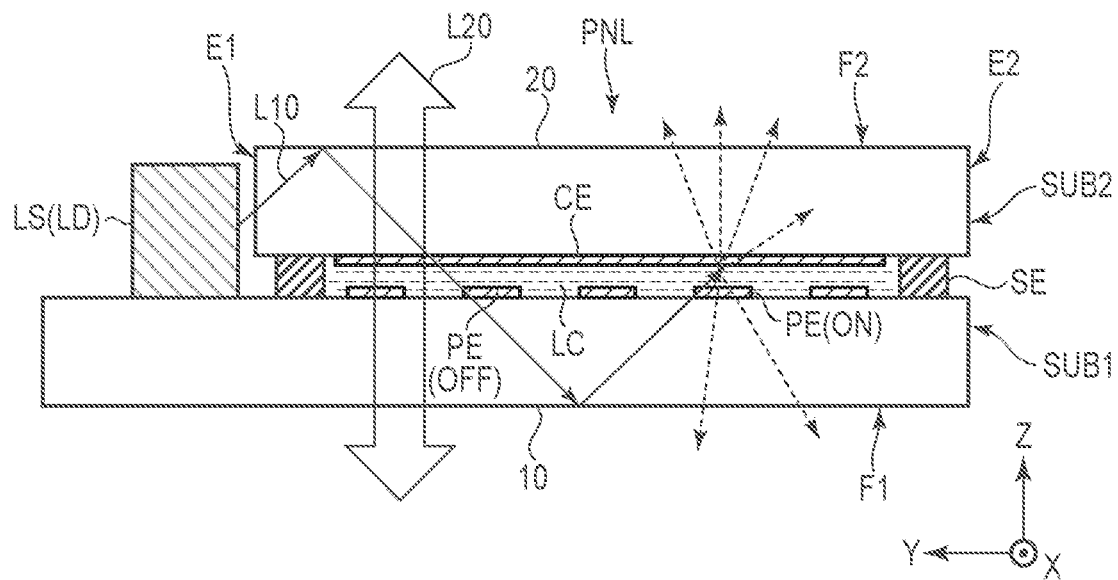
FIG. 4 is a cross-sectional view of a display panel in a case where the liquid crystal layer is in the scattering state.

FIG. 4 is a cross-sectional view of the display panel PNL for explaining the scattering state of the liquid crystal layer LC by the light from the light source LS. A light beam L10 emitted from the light source LS enters from the first side E1, and then, for example, propagates while being totally reflected from the second transparent base 20 to the first transparent base 10 via the liquid crystal layer LC.

Here, the light beam L10 is hardly scattered in the liquid crystal layer LC close to a pixel electrode PE to which voltage is not applied (OFF in the drawing). Therefore, the light beam L10 hardly leaks from a first surface F1 (a lower surface of the first transparent substrate 10) and a second surface F2 (an upper surface of the second transparent base 20) of the display panel PNL. At this time, the display panel PNL is set to a transparent state.

On the other hand, the light beam L10 is scattered in the liquid crystal layer LC close to a pixel electrode PE to which voltage is applied (ON in the drawing), and the scattered light beams emerge from the first surface F1 and the second surface F2. At this time, a preset electro-optic image is visually perceivably displayed on the display panel PNL. The electro-optic image is a concept including, for example, various images such as a moving image and a still image, and mere color forming without image display. Accordingly, as the light source LS controls the liquid crystal layer LC with the timings for emitting red light, green light and blue light, for example, a full-color electro-optic image can be displayed.

Note that, in the liquid crystal layer LC close to the pixel electrode PE to which voltage is not applied (OFF in the drawing), external light L20 entering from the first surface F1 or the second surface F2 passes through the display panel PNL almost without being scattered. At this time, when the display panel PNL is viewed from a second surface F2 side, a background on a first surface F1 side can be seen, and when the display panel PNL is viewed from the first surface F1 side, a background on the second surface F2 side can be seen. The above-described electro-optic image is displayed such that it emerges from the background.

From the above, according to the display device (electro-optic device) DSP of the present embodiment, for example, display drive by a field sequential method can be realized. In this method, one frame period includes a plurality of sub-frame periods (fields). For example, when the light source LS includes the red light-emitting element LDr, the green light-emitting element LDg and the blue light-emitting element LDb, one frame period includes sub-frame periods for red, green and blue.

In this case, in the red sub-frame period, the red light-emitting element LDr is turned on, and the pixels PX are controlled in accordance with red image data. Accordingly, a red electro-optic image is displayed. Similarly, in the green sub-frame period and the blue sub-frame period, the green light-emitting element LDg and the blue light-emitting element LDb are turned on, respectively, and the pixels PX are controlled in accordance with green image data and blue image data, respectively. Accordingly, a green electro-optic image and a blue electro-optic image are displayed, respectively. The red, green and blue electro-optic images displayed in a time-division manner as described above are synthesized and visually perceived as a multicolor display electro-optic image by the user.

Figure 5:
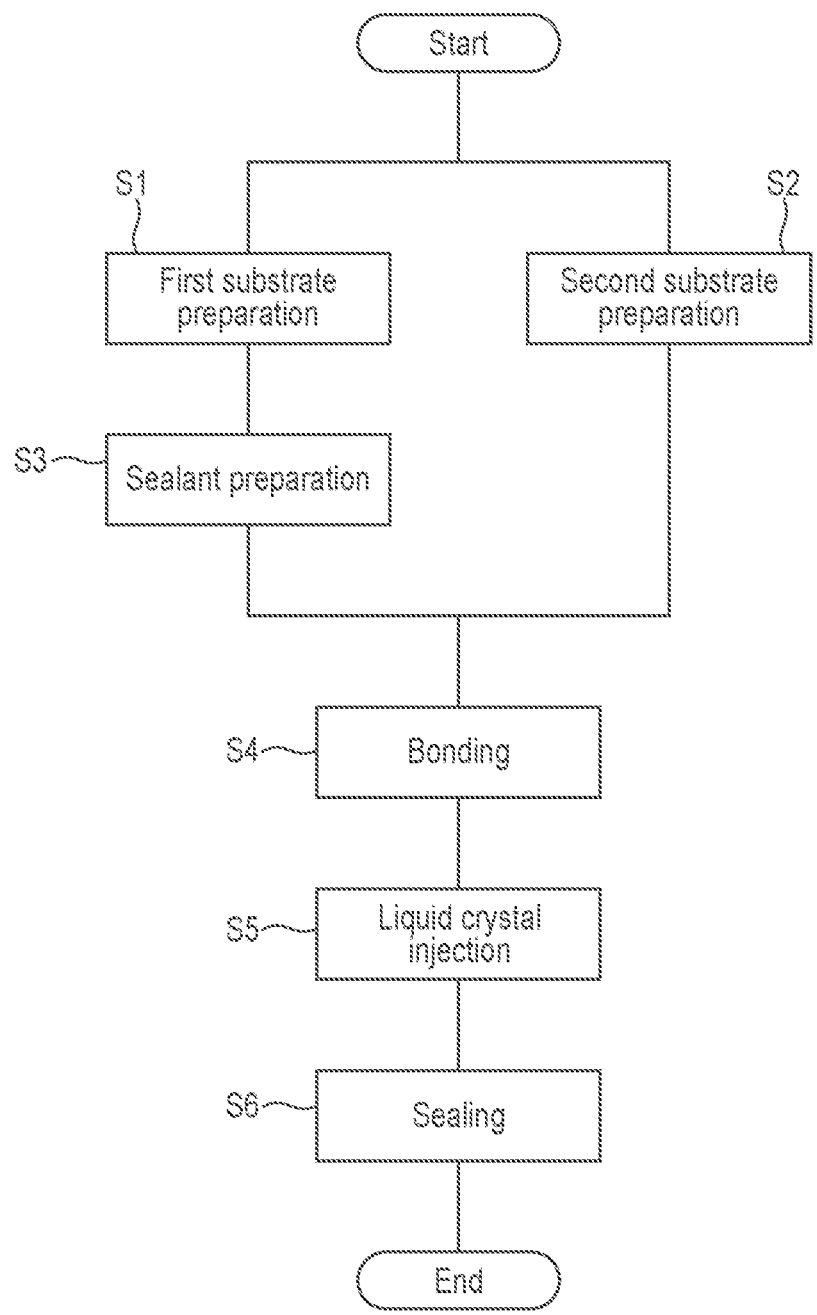
FIG. 5 is a flowchart showing a manufacturing process of the display panel.

FIG. 5 is a flowchart showing manufacturing processes S1 to S6 of the display panel PNL.

In order to improve alkali barrier properties, for example, an undercoat layer (not shown) formed of silicon oxide is formed on the transparent base 10, 20 for the display panel, and after a transparent electrode (the common electrode CE, the pixel electrode PE) formed of indium tin oxide (ITO) or the like is formed on the undercoat layer, the transparent base 10, 20 is patterned in a preset shape (for example, a rectangular shape). After that, an alignment film (the first alignment film 11, the second alignment film 21) is applied and burned, and alignment treatment such as rubbing treatment is provided.

Here, one transparent base 10 has a rectangular shape in planar view, and in the first transparent base 10, the drive circuits (the first scanning line driver GD1 and the second scanning line driver GD2) are provided in the peripheral area PA on the periphery of the display area DA. In addition, the first transparent base 10 has the terminal area TA. For example, in a state where the light source LS is arranged in the terminal area TA in a subsequent process, the light source LS is opposed to the first side E1 of the other transparent base 20 which will be described later. Accordingly, the first substrate SUB1 shown in FIGS. 1 and 2 is manufactured (S1).

The other transparent base 20 has the first side E1, the second side E2 on an opposite side to the first side E1, and the third side E3 and the fourth side E4 extending between the first side E1 and the second side E2. In the second transparent base 20, the fourth side E4 is arranged on an opposite side to the third side E3, and the second side E2 is opposed to an injection port 40 of the sealing portion SE which will be described later (see FIG. 6). Accordingly, the second substrate SUB2 shown in FIGS. 1 and 2 is manufactured (S2).

Then, as shown in FIG. 5, a sealing member is applied to one substrate (for example, the first substrate SUB), and the sealing portion SE (a first portion SE1 and a second portion SE2) is formed (S3). The sealing portion SE includes a first portion SE1 and a second portion SE2 shown in FIG. 6, and is provided in the peripheral area PA on the periphery of the display area DA in planar view. Regarding the sealing portion SE, the first portion SE1 and the second portion SE2 may be simultaneously formed in the same process or the second portion SE2 may be added on. As the method of adding-on, for example, the second portion SE2 is formed by injecting a sealing member into an opening of a bonded substrate (transparent base) LMS which will be described later.

The first portion SE1 has the injection port 40 for the liquid crystal composition, and has a frame-shaped contour which can be the outer shape of the display area DA. Then, in a liquid crystal injection process which will be described later, the liquid crystal composition is injected into the inside of the first portion SE1 (that is, the inside of the sealing portion). On the other hand, the second portion SE2 is formed adjacent to (overlapping) the outside of the first portion SE1. The second portion SE2 is configured to prevent a part of the liquid crystal composition from running around to the outside of the first portion SE1 (that is, the outside of the sealing portion), to prevent the liquid crystal composition running around to the outside of the first portion SE1 from reaching an incidence portion LIP, and the like during the liquid crystal injection. Note that the incidence portion LIP is a portion (range) where the light emitted from the light source LS (for example, the red light-emitting element LDr, the green light-emitting element LDg and the blue light-emitting element LDb) is incident on the side surface of the second substrate SUB2 (that is, the first side E1 of the second transparent base 20).

Then, as shown in FIG. 5, the first substrate SUB1 and the second substrate SUB2 are laid over each other and thermally compressed and bonded together. At this time, the circumferential edges of the substrates SUB1 and SUB2 are bonded together except for the injection port 40. Accordingly, as shown in FIG. 6, a bonded substrate (referred to also as transparent base) LMS where the three sides of the first substrate SUB1 are laid over the respective sides E2 to E4 of the second substrate SUB2 is formed (S4).

Here, the liquid crystal composition is brought into contact with the injection port 40 of the bonded substrate (transparent base) LMS in an atmospheric atmosphere, and the atmosphere is returned to atmospheric pressure. Accordingly, the liquid crystal composition is injected into the space surrounded by the sealing portion SE (more specifically, the first portion SE1) by a pressure difference and capillary action at this time (S5). After that, the injection port 40 is sealed by, for example, a sealing member 41 such as resin (S6). Accordingly, the display panel PNL shown in FIGS. 1 and 2 is manufactured.

Figure 6:
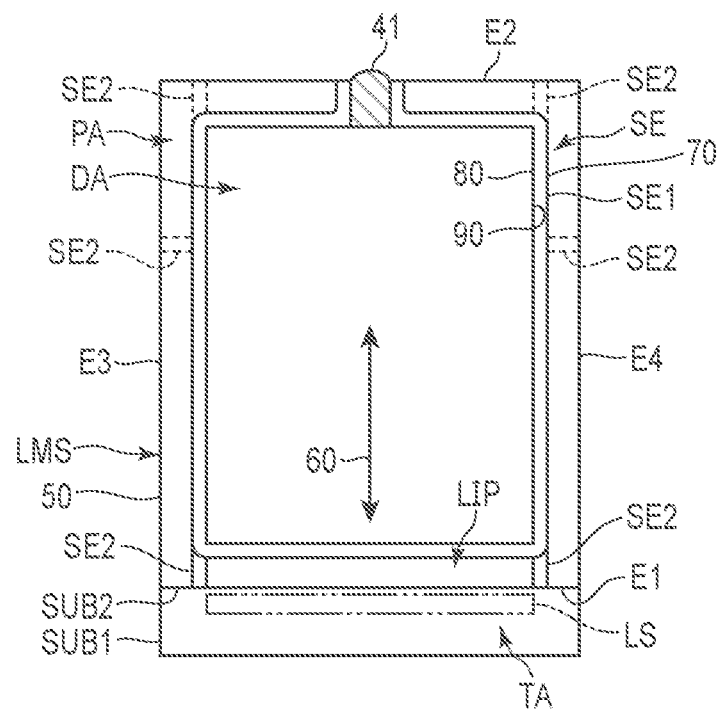
FIG. 6 is a plan view showing an arrangement configuration of a sealing portion according to the first embodiment.

FIG. 6 shows an arrangement configuration example of the sealing portion SE (the first portion SE1 and the second portion SE2) in the bonded substrate (transparent base) LMS. The first portion SE1 (that is, an outer end portion 70 of the first portion SE1) is arranged more inward than an end portion 50 of the bonded substrate (transparent base) LMS in planar view.

One second portion SE2 is arranged at each side of the injection port 40, and these second portions SE2 are arranged in the end portion 50 of the bonded substrate (transparent base) LMS in planar view. In this state, the second portions SE2 may overlap the second side E2 or may overlap the third side E3 and the fourth side E4. In addition, the second portions SE2 may overlap the first side E1 at both sides of the injection port 40. However, when the second portions SE2 overlap the first side E1, the second portions SE2 are arranged at positions avoiding the incidence portion LIP.

Meanwhile, the liquid crystal composition has the characteristics that the major axis is naturally aligned with an initial alignment direction (rubbing direction) 60, and by injecting the liquid crystal composition along this alignment direction, injection efficiency (in other words, injection speed) can be improved. Therefore, as shown in FIG. 6, a direction along which the light source LS and the injection port 40 are arranged should preferably be a direction along the initial alignment direction (rubbing direction) 60.

Note that, regarding the relationship of the injection port 40, the light source LS, and the initial alignment direction 60 of the liquid crystal composition by rubbing treatment, the incidence direction of light from the light source LS in the incidence portion LIP may be a direction crossing (preferably, a direction orthogonal to) the initial alignment direction 60.

From the above, according to the first embodiment, the injection port 40 is provided at a position farthest from the incidence portion LIP (portion (range) where the light of the light source LS is incident on the side surface (first side E1) of the second substrate SUB2). Accordingly, during the injection of the liquid crystal composition, the liquid crystal composition running around to the outside of the first portion SE1 does not reach the incidence portion LIP easily. As a result, the product accuracy of the electro-optic device (the display device DSP using the liquid crystal composition) itself can be maintained constant for a long time. In addition, the light-guiding properties from the light source to the second substrate SUB2 (the second transparent base 20) can be maintained and improved. Furthermore, unintended image display, light emission and color forming do not occur on the periphery of the bonded substrate (transparent base) LMS.

As shown in FIG. 6, according to the first embodiment, the second portions SE2 (the sealing portion SE) are arranged overlapping the first side E1 at both sides of the injection port 40. Accordingly, reaching of a part of the liquid crystal composition to the incidence portion LIP can be prevented. In addition, the second portions SE2 are arranged overlapping the second side E2, the third side E3 and the fourth side E4 at both sides of the injection port 40. Accordingly, a range where a part of the liquid crystal composition runs around to the outside of the first portion SE1 can be limited.

Second Embodiment

Figure 7A:
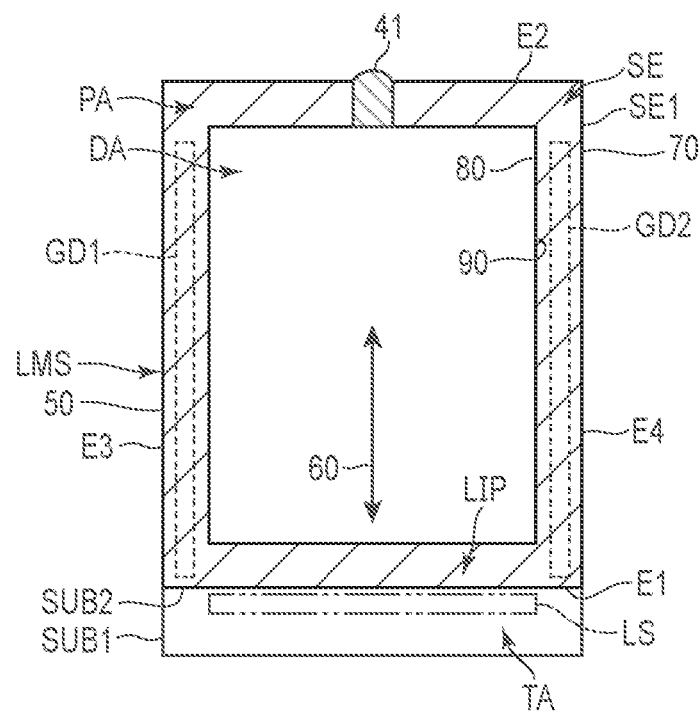
FIG. 7A is a plan view showing an arrangement configuration of a sealing portion and a drive circuit in an electro-optic device according to the second embodiment.
Figure 7B:
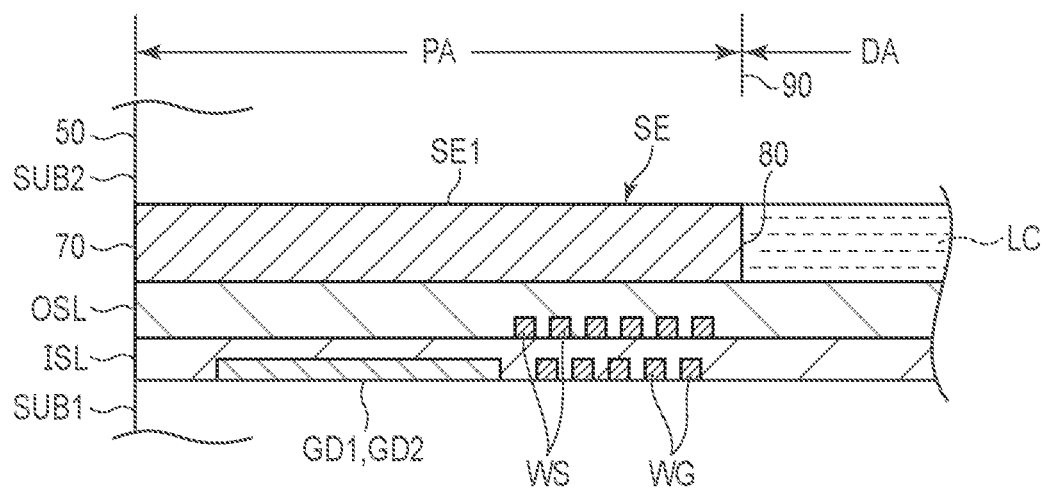
FIG. 7B is a cross-sectional view showing an arrangement configuration including the sealing portion and the drive circuit of FIG. 7A.

FIGS. 7A and 7B are illustrations showing an arrangement configuration of the sealing portion SE and the drive circuits (the first scanning line driver GD1 and the second scanning line driver GD2) in the bonded substrate (transparent base) LMS in the second embodiment. The sealing portion SE according to the present embodiment (that is, the first portion SE1) covers at least a part of the drive circuits GD1 and GD2 and a plurality of wiring lines WS and WG on the periphery of the substrate. In FIGS. 7A and 7B, as one example, the sealing portion SE (the first portion SE1) covers the entire peripheral area PA except the terminal TA, that is, all the drive circuits GD1 and GD2 and the wiring lines WS and WG via an organic insulating film OSL and an insulating layer ISL, except for the injection port 40. The wiring lines WG are formed in the same layer as the scanning signal lines G (see FIG. 1) and are covered with the insulating layer ISL. The wiring lines WS are formed in the same layer as the video signal lines S (see FIG. 1) and are covered with the organic insulating film OSL.

Here, the peripheral area PA includes not only a portion (area) on the periphery of the display area DA but also a portion (area) of the display area DA other than an active area which carries out intended image display, light emission and color forming, in order words, a portion (area) of the display area DA other than an area in which the pixels PX (see FIG. 1) are arrayed in a matrix. Accordingly, in the example of FIGS. 7A and 7B, regarding the sealing portion SE (the first portion SE1), its outer end portion 70 overlaps the end portion 50 of the bonded substrate (transparent base) LMS, and its inner end portion 80 overlaps an end portion 90 of the display area DA (more specifically, the active area).

From the above, according to the embodiment of FIGS. 7A and 7B, the entire peripheral area PA except the injection port 40 is filled with the sealing portion SE (the first portion SE1) without space. In this case, an entire area in which the drive circuits GD1 and GD2 and the wiring lines WS and WG are routed except the injection port 40 is covered with the sealing portion SE (the first portion SE1) without space. Accordingly, no space is left for the liquid crystal composition to run around to the outside of the sealing portion SE (the first portion SE1) during the injection of the liquid crystal composition. As a result, electric fields of the drive circuits GD1 and GD2 and the wiring lines WS and WG do not reach the liquid crystal layer LC (the liquid crystal composition) easily. Accordingly, the product accuracy of the electro-optic device (the display device DSP using the liquid crystal composition) itself can be maintained constant for a long time. In addition, the light-guiding properties from the light source LS to the second substrate SUB2 (the second transparent base 20) can be maintained and improved. Furthermore, unintended image display, light emission and color forming do not occur on the periphery of the bonded substrate (transparent base) LMS.

Figure 8:
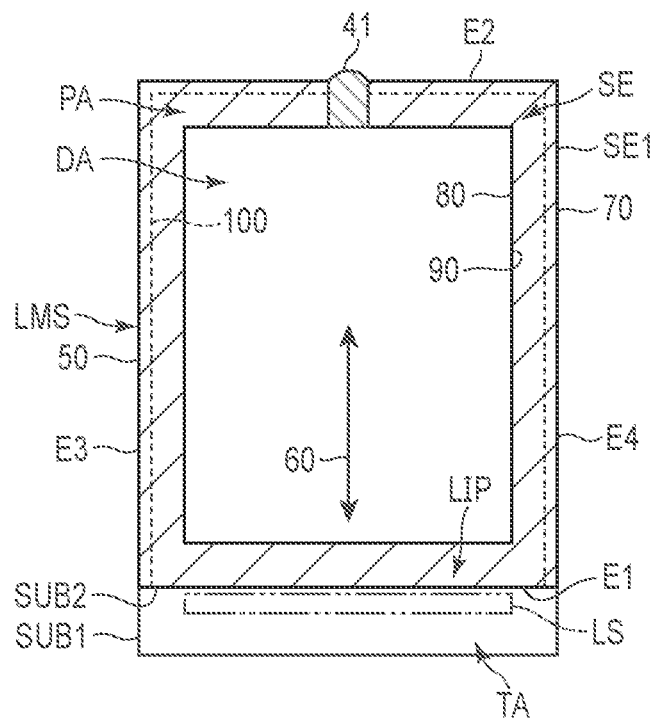
FIG. 8 is a plan view showing an arrangement configuration of the sealing portion and a projecting portion in the second embodiment.

FIG. 8 is a plan view showing an arrangement configuration of the sealing portion SE (the first portion SE1) covering the entire peripheral area PA and a projecting portion 100 in the second embodiment. The projecting portion 100 according to the present embodiment is provided along the end portion 50 of the bonded substrate (transparent base) LMS. In FIG. 8, as one example, the projecting portion 100 projects toward the sealing portion SE (the first portion SE1) while extending along the edge of the bonded substrate (transparent base) LMS (that is, the second side E2, the third side E3 and the fourth side E4) except the injection port 40. In other words, the outer end portion 70 of the sealing portion SE (the first portion SE1) overlaps the projecting portion 100 in planar view.

Figure 9:
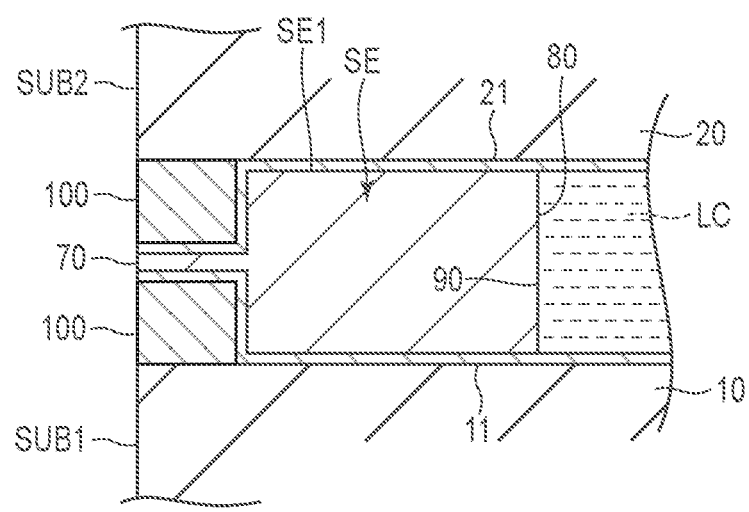
FIG. 9 is a cross-sectional view of the sealing portion and the projecting portion of FIG. 8.

FIG. 9 is a cross-sectional view showing the outer end portion 70 of the sealing portion SE (the first portion SE1) overlapping the projecting portion 100. In FIG. 9, as one example, the film thickness of the outer end portion 70 of the sealing portion SE (the first portion SE1) is less than the film thickness of the other part of the sealing portion SE. In addition, in the example of FIG. 9, the projecting portion 100 is arranged adjacent to both sides of the outer end portion 70 such that the projection portion 100 sandwiches the outer end portion 70 of the sealing portion SE (the first portion SE1).

From the above, according to the embodiment of FIGS. 8 and 9, the film thickness of the outer end portion 70 of the sealing portion SE (the first portion SE1) is reduced by the projecting portion 100. Accordingly, in a cutting process of the bonded substrate (transparent base) LMS, cutting can be carried out easily. As a result, the manufacturing efficiency of the display device (electro-optic device) DSP can be improved.

Figure 10:
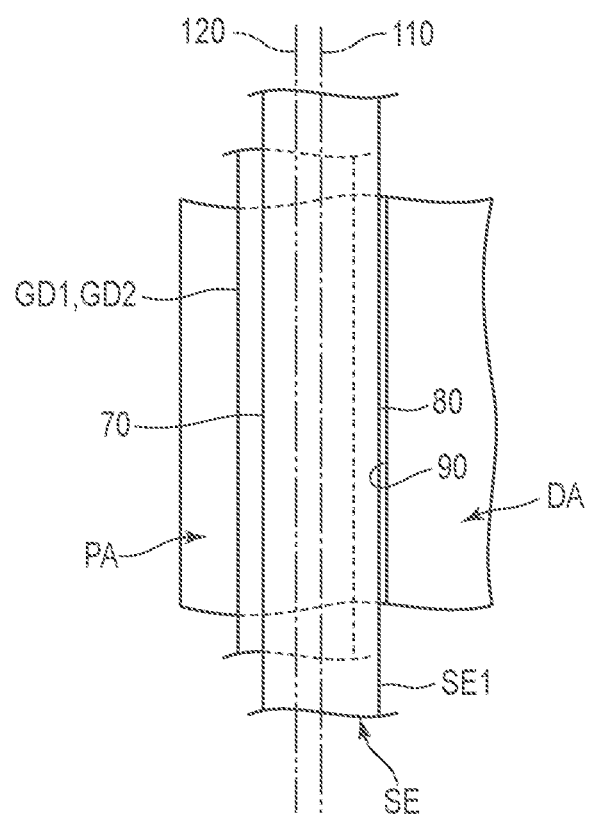
FIG. 10 is an enlarged plan view showing a part of an arrangement configuration of the sealing portion and the drive circuit of FIG. 7A and an electro-optic area.

FIG. 10 is a plan view showing an arrangement configuration of the sealing portion SE (the first portion SE1), the drive circuit (the first scanning line driver GD1, the second scanning line driver GD2) and the display area DA in the second embodiment. The sealing portion SE (the first portion SE1) does not have to cover the entire peripheral area PA except the injection port 40 as shown in FIG. 7A, but only has to cover at least a part of the driver circuit GD1, GD2 and a wiring line (not shown) on the periphery of the substrate. Note that, for example, a shift register circuit, a level shifter circuit, a buffer circuit and the like are included in the drive circuit (that is, the scanning circuit GC1, GC2).

In FIG. 10, as one example, the sealing portion SE (the first portion SE1) is located closer to the display area DA while covering a part of the drive circuit GD1, GD2. In this case, the percentage of the drive circuit GD1, GD2 covered with the sealing portion SE (the first portion SE1) in a width direction should preferably be greater than or equal to 50%.

Here, in a mode where a part of the drive circuit GD1, GD2 is covered with the sealing portion SE (the first portion SE1), a central portion 110 in the width direction of the sealing portion SE (the first portion SE1) is closer to the display area DA than a central portion 120 in the width direction of the drive circuit GD1, GD2. The inner end portion 80 of the sealing portion SE (the first portion SE1) is arranged between the drive circuit GD1, GD2 and the display area DA.

From the above, according to the embodiment of FIG. 10, at least a part of the drive circuit GD1, GD2 and the wiring line on the periphery of the substrate are covered with the sealing portion SE (the first portion SE1). Accordingly, the filling amount and filling range of the sealing portion SE (the first portion SE1) can be reduced. As a result, the cost reduction of the display device (electro-optic device) DSP can be achieved.

Third Embodiment

Figure 11:
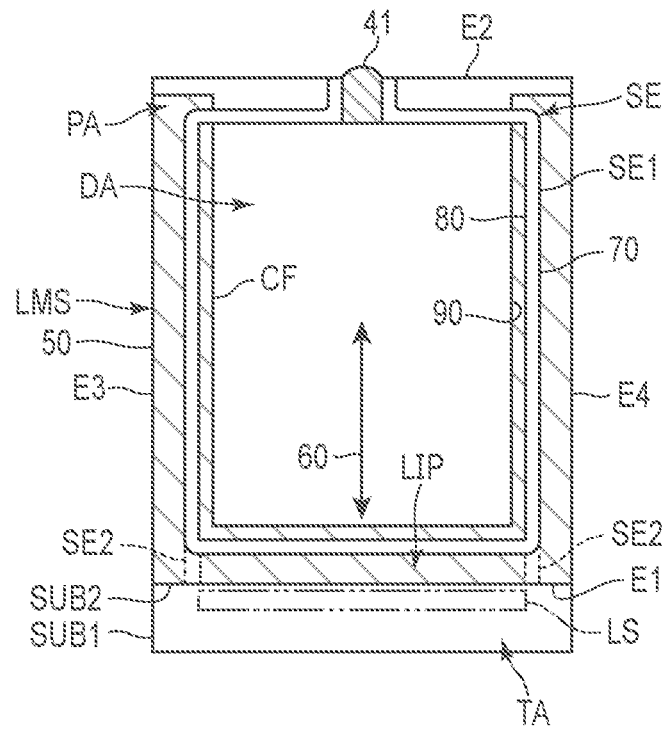
FIG. 11 is a plan view showing an arrangement configuration of the sealing portion and a conductive film (shield electrode) in an electro-optic device according to the third embodiment.
Figure 12:
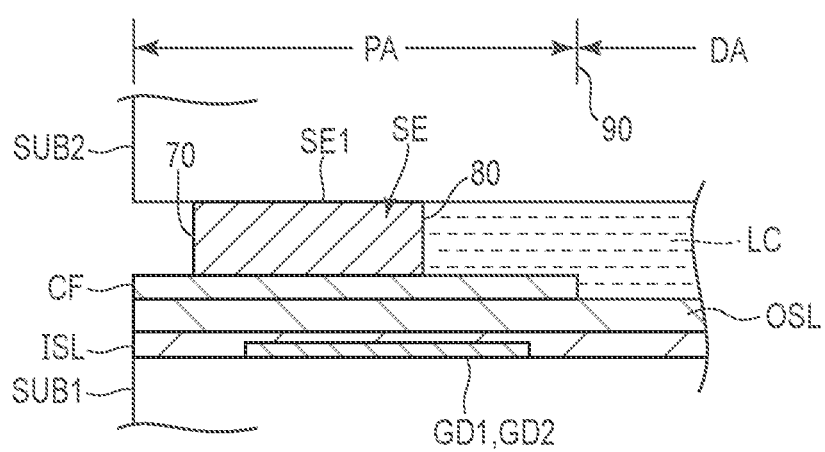
FIG. 12 is a cross-sectional view of the electro-optic device of FIG. 11.

FIGS. 11 and 12 are illustrations showing an arrangement configuration of the sealing portion SE (the first portion SE1 and the second portions SE2) and a conductive film CF (referred to also as a shield electrode) in the bonded substrate (transparent base) LMS in the third embodiment. In the sealing portion SE according to the present embodiment, the first portion SE1 is the same as that of the arrangement configuration of FIG. 6, and the second portions SE2 overlap the first side E1 at positions avoiding the incidence portion LIP at both sides of the injection port 40.

In addition, the conductive film CF according to the present embodiment is arranged at least between the drive circuit (the first scanning line driver GD1, the second scanning line driver GD2) and the liquid crystal layer LC (the liquid crystal composition). Here, in a case where a routing line (not shown) is present on the periphery of the drive circuit GD1, GD2 and in the peripheral area PA, the conductive film CF is arranged extending between the periphery of the drive circuit GD1, GD2 or the routing line and the liquid crystal layer LC (the liquid crystal composition). The conductive film CF is arranged along the first side E1, the third side E3 and the fourth side E4. The conductive film CF can be formed of, for example, a transparent conductive material such as ITO.

In FIG. 12, as one example, the drive circuit GD1, GD2 including the routing line extends close to the end portion 90 of the display area DA beyond the inner end portion 80 of the sealing portion SE (the first portion SE1). The conductive film CF is disposed such that the conductive film CF covers the drive circuit GD1, GD2, and the conductive film CF is formed on the drive circuit GD1, GD2 via the organic insulating film OSL and the insulating layer ISL. In the example of FIG. 12, the conductive film CF extends more outward than the outer end portion 70 of the sealing portion SE (the first portion SE1), and extends to the liquid crystal layer LC (the liquid crystal composition) beyond the inner end portion 80.

In addition, in order to prevent an electric field from being formed between the drive circuit GD1, GD2 and a counter electrode opposed to the drive circuit GD1, GD2 (for example, the common electrode CE of FIG. 2), a predetermined voltage is applied to the conductive film CF. Here, to the common electrode CE, a common voltage (for example, an AC voltage) is supplied from an external power supply (not shown) via the controller CT. In this case, the predetermined voltage supplied to the conductive film CF should preferably be the common voltage. Accordingly, formation of an electric field between the common electrode CE and the conductive film CF, between the conductive film CF and the drive circuit GD1, GD2, and between the common electrode CE and the drive circuit GD1, GD2 can be prevented.

From the above, according to the third embodiment, the conductive film CF extends such that the conductive film CF covers the drive circuit GD1, GD2 including the routing line. Accordingly, formation of an electric field between the drive circuit GD1, GD2 and the common electrode CE can be prevented. As a result, occurrence of unintended image display, light emission and color forming on the periphery of the display area DA can be prevented.

According to the third embodiment, during the injection of the liquid crystal composition, even if the liquid crystal composition runs around to the outside of the sealing portion SE (the first portion SE1), formation of an electric field between the drive circuit GD1, GD2 and the counter electrode opposed to the drive circuit GD1, GD2 (the common electrode CE) can be prevented. Accordingly, occurrence of unintended image display, light emission and color forming on the periphery of the display area DA can be prevented beforehand.

All display devices and electro-optic devices which are implementable by a person of ordinary skill in the art through appropriate design changes to the display devices described above as the embodiments of the present invention come within the scope of the present invention as long as they are in keeping with the spirit of the present invention.

Various modifications are easily conceivable within the category of the ideas of the present invention by a person of ordinary skill in the art, and these modifications are also considered to fall within the scope of the present invention. For example, additions, deletions or changes in design of the constituent elements or additions, omissions, or changes in condition of the processes which are appropriately made by a person of ordinary skill in the art in the above embodiments fall within the scope of the present invention as long as they are in keeping with the spirit of the present invention.

In addition, other advantages of the aspects described in the embodiments which are obvious from the descriptions of the present specification or which are appropriately conceivable by a person of ordinary skill in the art are considered to be achievable by the present invention as a matter of course.

What is claimed is:

1. An electro-optic device comprising:
    an electro-optic panel including a transparent base including an electro-optic area and a peripheral area on a periphery of the electro-optic area;
    a sealing portion provided in the peripheral area of the transparent base in planar view;
    a liquid crystal composition containing a polymeric material and sealed by the transparent base and the sealing portion;
    an injection port for the liquid crystal composition provided in the peripheral area of the transparent base in planar view; and
    a light source arranged opposed to a side surface of the transparent base, wherein
    the transparent base has a first side and a second side on an opposite side to the first side in planar view,
    the electro-optic area of the transparent base is arranged between the first side and the second side in planar view,
    the light source is opposed to the first side in a planar view,
    the injection port is opposed to the second side in planar view,
    the sealing portion has a first portion and a second portion,
    the first portion surrounds the electro-optic area,
    a part of the first portion is formed in a line parallel to the first side and is located near the first side,
    an entire outer end portion of the part of the first portion is arranged more inward to the electro-optic area than an end portion of the first side of the transparent base in planar view,
    the second portion is formed in a line between the part of the first portion and the first side in planar view,
    an outer end portion of the second portion is arranged in the end portion of the first side of the transparent base in planar view, and
    the second portion does not oppose to the light source in planar view.

2. The electro-optic device of claim 1, wherein
    the end portion of the first side overlaps the side surface,
    the sealing portion has a pair of third portions,
    each of the third portions is formed in a line between the first portion and the second side in planar view,
    the pair of third portions overlaps the second side in planar view, and
    the injection port is located between the pair of third portions.

3. The electro-optic device of claim 1, wherein
    the transparent base has a third side extending between the first side and the second side in planar view,
    the second portion is in parallel to the third side,
    the sealing portion has a fourth portion,
    the fourth portion is formed in a line between the first portion and the third side,
    the fourth portion is in parallel to the first side, and
    the fourth portion overlaps the third side in planar view.

4. The electro-optic device of claim 1, wherein
    the end portion of the first side overlaps the side surface,
    the electro-optic panel includes an alignment film which aligns the liquid crystal composition along an initial alignment direction,
    a direction along which the light source and the injection port are arranged is a direction along the initial alignment direction, and
    the second portion is parallel to the direction along which the light source and the injection port are arranged.

* * * * *